US012641036B2

(12) United States Patent
Azari et al.

(10) Patent No.: US 12,641,036 B2
(45) Date of Patent: May 26, 2026

(54) MANAGING CLOSED CONTROL LOOPS

(71) Applicant: Telefonaktiebolaget LM Ericsson (publ), Stockholm (SE)

(72) Inventors: Amin Azari, Järfälla (SE); Swarup Kumar Mohalik, Bangalore (IN); Pedro Henrique Gomes Da Silva, São Paulo (BR); András Zahemszky, Sollentuna (SE); Refik Fatih Ustok, Istanbul (AR); Ahmet Cihat Baktir, Istanbul (AR); Elham Dehghan Biyar, Istanbul (AR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 299 days.

(21) Appl. No.: 18/285,882

(22) PCT Filed: Apr. 8, 2021

(86) PCT No.: PCT/SE2021/050319
§ 371 (c)(1),
(2) Date: Oct. 6, 2023

(87) PCT Pub. No.: WO2022/216192
PCT Pub. Date: Oct. 13, 2022

(65) Prior Publication Data
US 2024/0187354 A1     Jun. 6, 2024

(51) Int. Cl.
*H04L 47/70*     (2022.01)
*H04L 47/2425*     (2022.01)

(52) U.S. Cl.
CPC .......... *H04L 47/82* (2013.01); *H04L 47/2425* (2013.01)

(58) Field of Classification Search
CPC ..... H04L 47/82; H04L 47/2425; G06F 9/448; G06N 3/006; G06N 20/00; H04W 24/02
See application file for complete search history.

(56) References Cited

U.S. PATENT DOCUMENTS 12,050,438 B1 *  7/2024  Ebrahimi Afrouzi ........................
                                         G05B 13/0205
2017/0243133 A1 *  8/2017  Zavesky ................ G06N 20/00
(Continued)

FOREIGN PATENT DOCUMENTS

CN          110198237 A      9/2019
WO       2019081783 A1    10/2017
(Continued)

OTHER PUBLICATIONS

International Search Report and Written Opinion of the International Searching Authority, PCT/SE2021/050319, mailed Dec. 30, 2021, 14 pages.
(Continued)

*Primary Examiner* — Abdullahi E Salad
(74) *Attorney, Agent, or Firm* — Sage Patent Group

(57) ABSTRACT

A computer implemented method for managing a plurality of closed control loops, CLs, operable in a control system. The method includes using a reinforcement learning, RL, agent, to determine an action to perform in the control system with respect to the plurality of closed CLs in the control system. The RL agent is rewarded based on an extent to which an environment on which the control system acts moves towards a predefined target as a result of performing the determined action.

20 Claims, 10 Drawing Sheets

(56) References Cited

U.S. PATENT DOCUMENTS

| | | | | |
|---|---|---|---|---|
| 2018/0264971 A1* | 9/2018 | Lor | .......................... | B60L 15/20 |
| 2019/0286478 A1* | 9/2019 | Sengupta | ................ | G06F 9/505 |
| 2021/0126851 A1* | 4/2021 | Chisholm | ............... | H04L 47/82 |

FOREIGN PATENT DOCUMENTS

| | | | | | |
|---|---|---|---|---|---|
| WO | 2018184666 A1 | 10/2018 | | | |
| WO | 2019183195 A | 9/2019 | | | |
| WO | WO-2019211134 A1 * | 11/2019 | ............ | G06N 3/086 |
| WO | 2021025601 A1 | 2/2021 | | | |
| WO | 2022197225 A1 | 9/2022 | | | |

OTHER PUBLICATIONS

Mazhar, Rathore M., "The Role of AI, Machine Learning, and Big Data in Digital Twinning: A Systematic Literature Review, Challenges, and Opportunities," Digital Object Identifier, 10.1109/ACCESS.2021.3060863, Feb. 22, 2021, 23 pages.

International Preliminary Report on Patentability of the International Preliminary Examining Authority, PCT/SE2021/050319, dated Jul. 13, 2023, 19 pages.
Dragosh, Pamela, Control Loop Sub Committee Working Requirements and Future Roadmap, Jan. 6, 2021, Wiki, Atlassian Confluence Open Source Project License, 3 pages.
Inam, Rafia et al., "5G network programmability for mission-critical applications," Ericsson Technology Review, Jan. 26, 2018, 22 pages.
ETSI GS ZSM 009-1 V0.10.3 (Nov. 2022); Group Specification; Zero-Touch Network and Service Management (ZSM); Closed-loop automation; Enablers; 36 pages.
Schluse, Michael et al., "From simulation to experimentable digital twins: Simulation-based development and operation of complex technical systems," 2016 IEEE International Symposium on Systems Engineering (ISSE), Edinburgh, UK, 2016, 6 pages.
Industrial Digital Twin Association (IDTA), "Specification—Details of the Asset Administration Shell. Part 1—The exchange of information between partners in the value chain of Industrie 4.0 (Version 3.0RC02)," Published by the Federal Ministry for Economic Affairs and Climate Action (BMWK), 235 pages.

* cited by examiner

Figure 2:
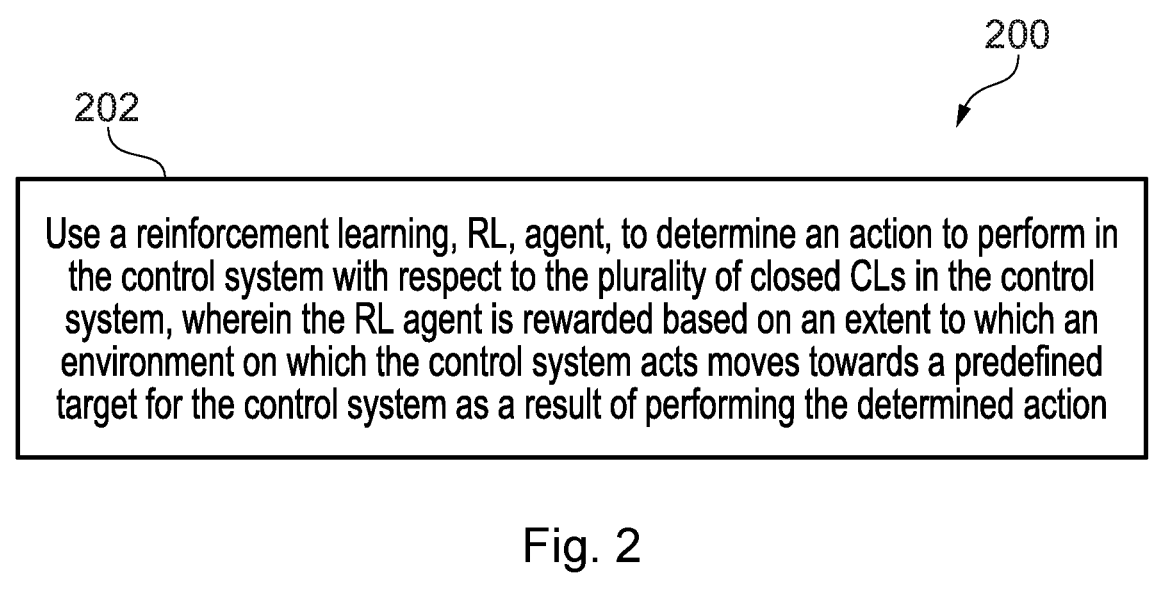

200

202

Use a reinforcement learning, RL, agent, to determine an action to perform in the control system with respect to the plurality of closed CLs in the control system, wherein the RL agent is rewarded based on an extent to which an environment on which the control system acts moves towards a predefined target for the control system as a result of performing the determined action

Init (C' = all loops, T = default, episode length = L) — 602

Active loops in C'\C, Deactivate loops in C\C', Set timer to T — 604

Collect sc = <intent satisfaction, resource usage, CL resource usage> for δ
Total = Total + sc — 606

δ expired       Timer == 0

Retur <C', reward(Total)>
L-- — 608

Select action C', time_interval T (exploration/off-policy) — 610

L == 0 (End of episode)

End — 612

MANAGING CLOSED CONTROL LOOPS

CROSS REFERENCE TO RELATED APPLICATIONS

This application is a 35 U.S.C. § 371 national stage application of PCT International Application No. PCT/SE2021/050319 filed on Apr. 8, 2021, the disclosure and content of which is incorporated by reference herein in its entirety.

TECHNICAL FIELD

This disclosure relates to methods, nodes and systems in a communications network. More particularly but non-exclusively, the disclosure relates to managing closed control loops in communications networks.

BACKGROUND

Due to the large number of connected intelligent devices such as sensors, smartphones, industrial and massive IoT connections, the management phase for operators and network service providers is becoming increasingly challenging.

The future of the networks (5G and beyond) is likely to be intent-driven, where the requirements and expectations of services are specified in a declarative way, e.g. without prescribing a specific manner in which a service should be realised, but rather by setting an intent (e.g. target) and leaving freedom for adaptation in order to cope with the highly dynamic environment.

Because of intent-driven management, humans do not intervene in the management loops, and the interactions between the human beings and the loops are thus conveyed through intents. Accordingly, an intent (otherwise known as a business-intent) should be initially defined for setting a specific goal, which is then translated into a language to be processed by the network in order to achieve suitable results.

In addition, this procedure needs multiple iterative steps whereby lessons from preceding experiences are used to develop the system and enable an efficient policy management scheme. Intents are used in many aspects of telecom networks such as network topology or 5G NR cells configuration, more complicated intents are also used for increasing customer satisfaction scores. Top-level intents may be decomposed into multiple lower-level intents that are processed in parallel to fulfill the overall goals and requirements.

One of the components that enable intent-driven networking is closed control loop (CL) automation. The integration of CLs into the network operations enhances the capability of self-monitoring and implements a solution to fix problems in an automated manner by utilizing policy-based or AI-based decision-making processes.

In communications networks, closed CLs typically operate in various domains, including OAM, RAN, transport network (TN), and core network (CN) for fulfilment of intents.

SUMMARY

The purpose of closed CLs is to change a system state in response to an event or set of events. In the context of this disclosure, a CL can generally comprise (i) an orchestrated object and an orchestrator, (ii) an analytics engine, including knowledge base and collected metrics from the orchestrated object, for providing insight about its state, and (iii) a policy engine, in which appropriate plans are enforced to the orchestrator. In this structure, the policy engine embodies the functionalities to provide and maintain the policies in the form of rules, conditions, constraints, attributes or needs. A high-level policy definition should be compiled into a set of machine-readable rules, so that the corresponding actions can be taken in an event-driven or poll-driven manner. The orchestrator thus governs the orchestrated object by taking actions based on the received rules.

In an intent-driven network where multiple CLs are used to manage the network and ensure the fulfilment of various requirements, intents with different priority levels will coexist. For example, consider an intent targeting enhanced reliability for customer and another intent with the aim of OPEX reduction for the MNO. When the respective CL(s) for the intent of customer are active, there might be epochs in which it is possible to fulfil the other intent by changing the CL for the customer (without any change in the customer intent). This is usually the case when the customer's intent is getting over-fulfilment.

There might therefore be multiple ways to fulfil an intent, e.g. through the use of different combinations of active CLs. In such case, there is a need for assessing different ways of satisfying intents in order to determine the most efficient combinations of CLs.

Thus according to a first aspect herein, there is a computer implemented method for managing a plurality of closed control loops, CLs, operable in a control system. The method comprises: using a reinforcement learning, RL, agent, to determine an action to perform in the control system with respect to the plurality of closed CLs in the control system; wherein the RL agent is rewarded based on an extent to which an environment on which the control system acts moves towards a predefined target for the control system as a result of performing the determined action.

According to a second aspect there is an apparatus for managing a plurality of closed control loops, CLs, operable in a control system. The apparatus comprises a memory comprising instruction data representing a set of instructions, and a processor configured to communicate with the memory and to execute the set of instructions. The set of instructions, when executed by the processor, cause the processor to: use a reinforcement learning, RL, agent, to determine an action to perform in the control system with respect to the plurality of closed CLs in the control system; wherein the RL agent is rewarded based on an extent to which an environment on which the control system acts moves towards a predefined target as a result of performing the determined action.

According to a third aspect there is a node in a communications network for managing a plurality of closed control loops, CLs, operable in a control system. The node is adapted to: use a reinforcement learning, RL, agent, to determine an action to perform in the control system with respect to the plurality of closed CLs in the control system; wherein the RL agent is rewarded based on an extent to which an environment on which the control system acts moves towards a predefined target as a result of performing the determined action.

According to a fourth aspect there is a computer program comprising instructions which, when executed on at least one processor, cause the at least one processor to carry out a method according to the first aspect.

According to a fifth aspect there is a carrier containing a computer program according to the fourth aspect, wherein the carrier comprises one of an electronic signal, optical signal, radio signal or computer readable storage medium.

According to a sixth aspect there is a computer program product comprising non transitory computer readable media having stored thereon a computer program according to the fourth aspect.

Thus, according to aspects herein, methods and apparatus are provided for managing a plurality of control loops in order to move a control system towards a predefined target (which may for example be a business intent). The RL agent may be used to optimize the control system in situations where different CLs may be used to achieve the target or part of the target. As will be described in more detail below, in embodiments where the predefined target relates to energy consumption of the CLs or the amount of data processed and transferred around the network for the CLs, then the RL agent may be used to reduce data transfer and thus improve user privacy.

BRIEF DESCRIPTION OF THE DRAWINGS

For a better understanding and to show more clearly how embodiments herein may be carried into effect, reference will now be made, by way of example only, to the accompanying drawings, in which:

FIG. 2 shows a method 200 according to some embodiments herein;

DETAILED DESCRIPTION

Some embodiments of the disclosure herein relate to a communications network (or telecommunications network). A communications network may comprise any one, or any combination of: a wired link (e.g. ASDL) or a wireless link such as Global System for Mobile Communications (GSM), Wideband Code Division Multiple Access (WCDMA), Long Term Evolution (LTE), New Radio (NR), WiFi, Bluetooth or future wireless technologies. The skilled person will appreciate that these are merely examples and that the communications network may comprise other types of links. A wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Figure 1:
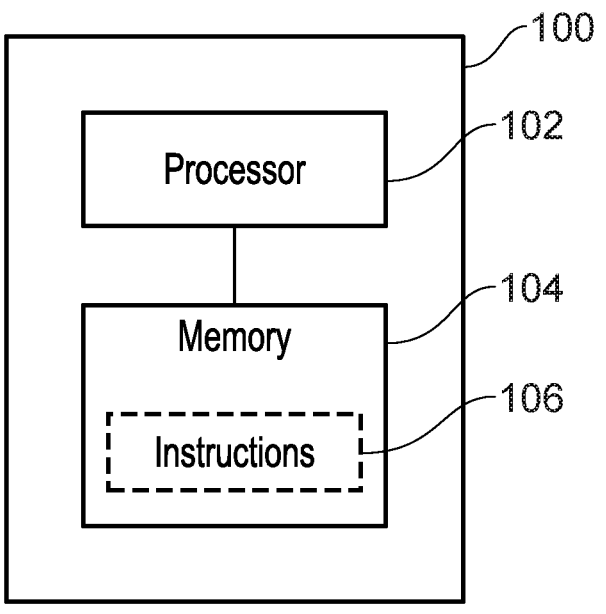
FIG. 1 shows an apparatus according to some embodiments herein.

FIG. 1 illustrates a network node 100 in a communications network according to some embodiments herein. Generally, the node 100 may comprise any component or network function (e.g. any hardware or software module) in the communications network suitable for performing the functions described herein. For example, a node may comprise equipment capable, configured, arranged and/or operable to communicate directly or indirectly with a UE (such as a wireless device) and/or with other network nodes or equipment in the communications network to enable and/or provide wireless or wired access to the UE and/or to perform other functions (e.g., administration) in the communications network. Examples of nodes include, but are not limited to, access points (APs) (e.g., radio access points), base stations (BSs) (e.g., radio base stations, Node Bs, evolved Node Bs (eNBs) and NR NodeBs (gNBs)). Further examples of nodes include but are not limited to core network functions such as, for example, core network functions in a Fifth Generation Core network (5GC).

The node 100 is configured (e.g. adapted, operative, or programmed) to perform any of the embodiments of the method 200 as described below. It will be appreciated that the node 100 may comprise one or more virtual machines running different software and/or processes. The node 100 may therefore comprise one or more servers, switches and/or storage devices and/or may comprise cloud computing infrastructure or infrastructure configured to perform in a distributed manner, that runs the software and/or processes.

The node 100 may comprise a processor (e.g. processing circuitry or logic) 102. The processor 102 may control the operation of the node 100 in the manner described herein. The processor 102 can comprise one or more processors, processing units, multi-core processors or modules that are configured or programmed to control the node 100 in the manner described herein. In particular implementations, the processor 102 can comprise a plurality of software and/or hardware modules that are each configured to perform, or are for performing, individual or multiple steps of the functionality of the node 100 as described herein.

The node 100 may comprise a memory 104. In some embodiments, the memory 104 of the node 100 can be configured to store program code or instructions 106 that can be executed by the processor 102 of the node 100 to perform the functionality described herein. Alternatively or in addition, the memory 104 of the node 100, can be configured to store any requests, resources, information, data, signals, or similar that are described herein. The processor 102 of the node 100 may be configured to control the memory 104 of the node 100 to store any requests, resources, information, data, signals, or similar that are described herein.

It will be appreciated that the node 100 may comprise other components in addition or alternatively to those indicated in FIG. 1. For example, in some embodiments, the node 100 may comprise a communications interface. The communications interface may be for use in communicating with other nodes in the communications network, (e.g. such as other physical or virtual nodes). For example, the communications interface may be configured to transmit to and/or receive from other nodes or network functions requests, resources, information, data, signals, or similar. The processor 102 of node 100 may be configured to control such a communications interface to transmit to and/or receive from other nodes or network functions requests, resources, information, data, signals, or similar.

Briefly, in one embodiment, the node 100 may be for managing a plurality of closed control loops, CLs, operable in a control system. The node 100 is adapted (e.g. configured or operable) to use a reinforcement learning (RL) agent, to determine an action to perform in the control system with respect to the plurality of closed CLs in the control system. The RL agent is rewarded based on an extent to which an environment on which the control system acts, moves towards a predefined target as a result of performing the determined action.

Turning to FIG. 2, there is a computer implemented method 200 for managing a plurality of closed control loops, CLs, operable in a control system. The method comprises using 202 a reinforcement learning, RL, agent, to determine an action to perform in the control system with respect to the plurality of closed CLs in the control system, wherein the RL agent is rewarded based on an extent to which an environment on which the control system acts moves towards a predefined target as a result of performing the determined action.

The method 200 may be performed by a node in a communications network such as the node 100. In other embodiments the method may be performed by any apparatus comprising a processor and a memory, as described above with respect to FIG. 1.

A control system may manage (e.g. by commanding, directing, or regulating) the behaviour of other devices or systems using control loops (CLs). Control systems operate on an environment. The disclosure herein will generally be described with respect to control systems operating in communications network environments, however it will be appreciated that the methods and apparatus described herein may be applied to control systems operating on many other environments, including but not limited to control systems operating in industry, such as control systems for controlling processes in factory environments (e.g. smart-factories) or other manufacturing facilities. Other examples include, but are not limited to, control systems for operating robots, autonomous vehicles or autonomous aerial vehicles (e.g. drones).

Closed control loops (closed CLs) may generally utilize policy-based or AI-based decision-making processes. Policy-based decision making may be based, for example, on coded logic, in the manner of a decision tree. AI-based decision making processes may, for example, use reinforcement learning agents to optimise different aspects of the environment controlled or operated on by the control system.

In a communications network, CLs may be used in different parts of the network, such as in Operations Administrations and Management (OAM), Radio access Network (RAN), transport network (TN), and core network (CN). Closed CL loops may generally manage processes in the communications network. For example, closed CLs may be used in resource orchestration processes to allocate resources, and/or to determine configuration parameters with which to provide services. These are examples only however and the skilled person will appreciate that there are many other examples of closed CLs that operate in communications networks.

The RL agents described herein perform actions in order to move the environment that the control system operates on towards a predefined target. A predefined target may be a target configuration for the environment or a target performance for the environment. In some embodiments the target configuration may be an intent (or business intent). Such an intent may be expressed as a human-readable goal or requirement. In communications networks, an intent may be a target performance which is realized through the configurations of different network devices over which communication is performed.

In some embodiments the predefined target may be expressed in terms of Key Performance Indicators, or other measurable quantities or metrics in the environment. In embodiments where the environment relates to a communications network, the predefined target may comprise one or more Key Performance Indicator, KPI, targets, as determined (or translated) from a business intent, BI, for the communications network.

Figure 3:
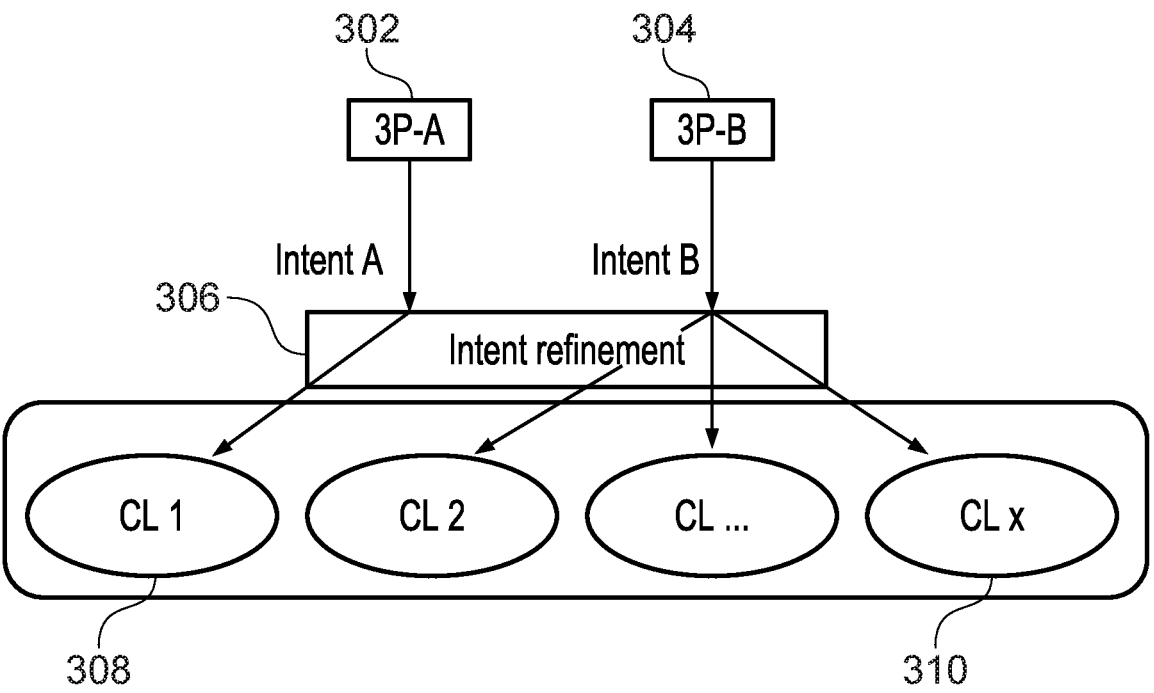
FIG. 3 illustrates intent-driven management according to some embodiments herein.

The predefined target may comprise (e.g. be broken down into) a plurality of sub-targets, and each sub-target may be assigned to a different one of the plurality of closed CLs. In other words, a larger goal may be split into smaller goals, each managed by a different CL. This is illustrated in FIG. 3 in which the overall process of target (or intent) decomposition is depicted where a top-level target 302, 304 defined by the customer is converted in an target refinement process 306 into multiple sub-targets to be addressed through closed-loop automation based on CLs 308, 310. These operations can be realized in two different ways: (1) a sub-target can be defined in an atomic manner so that a single closed loop instance can handle it, or (2) the scope of sub-targets can be relatively larger and an interaction among multiple CLs becomes necessary to meet the target goals.

Generally, due to the complexity of the systems on which the control systems act, there may be interaction between the policies of the plurality of closed CLs. For example, a target or sub target may be affected by more than one of the CLs. In other words, the decisions or actions of the CLs may affect the decisions or actions of other CLs. In such scenarios, a predefined target may be met using different combinations of active (or activated) CLs.

In a communications network, to satisfy a predefined target (such as an intent), a network management entity may enable several CLs for different domains. Some of these CLs may be independent and some of them may be dependent. As an example, consider a router from which traffic of interest is coming from. A queue size management CL at the router (which balances the delay and packet drop in communication) can affect a CL managing routing of the traffic, i.e., in case the first CL decides to drop further packets by reducing the queue size at router, the second CL can decide not to route all the traffic over this router. Thus, in this example, the CLs are interdependent.

Thus, generally, the methods and apparatus herein may be used for any kind of control systems where a design target is broken into sub targets, and the policies for satisfying the sub-targets interact, e.g. in scenarios with over shared resources.

As noted above, a RL agent is used to determine actions to perform in the control system with respect to the plurality of closed CLs in the control system, in order to move the environment towards the predefined target.

The skilled person will be familiar with reinforcement learning and reinforcement learning agents, however, briefly, reinforcement learning is a type of machine learning process whereby a reinforcement learning agent (e.g. algorithm) is used to perform actions on a system (such as a communications network) to adjust the system according to an predefined target or objective (which may, for example, comprise moving the system towards an optimal or preferred state of the system). The reinforcement learning agent receives a reward based on whether the action changes the system in compliance with the objective (e.g. towards the preferred state), or against the objective (e.g. further away from the preferred state). The reinforcement learning agent therefore adjusts parameters in the system with the goal of maximising the rewards received.

Put more formally, a reinforcement learning agent receives an observation from an environment in state S and selects an action to maximize the expected future reward r. Based on the expected future rewards, a value function V for each state can be calculated and an optimal policy IT that maximizes the long term value function can be derived.

In the context of this disclosure, in some embodiments herein, the method is performed by a node in a communications network. The RL agent takes as input a state and outputs a suggested action to move the environment towards the predefined target.

As noted above, the "environment" may comprise e.g. a communications network environment, which may be described in terms of the network conditions in the communications network, the conditions in which the communications network is operating and/or the conditions in which devices connected to the communications network are operating.

In some embodiments herein, the state S provides an indication as to whether each of the plurality of closed CLs is currently active or inactive in the control system. The RL agent may use this information to determine an action to perform. As an example, the state may comprise a list of closed CLs that are currently active (it being implicit that other closed CLs in the plurality of CLs are inactive).

As an example, where $L_i$ represents the ith closed CL, if the $1^{st}$, $5^{th}$, $6^{th}$, $9^{th}$, $11^{th}$ and $21^{st}$ closed CLs are to be active, then the state may take the form: $S=<L_1, L_5, L_6, L_9, L_{11}, L_{21}>$. This is merely an example however and the skilled person will appreciate that indications of other forms may equally be used to describe which closed CLs are to be active.

The RL agent may determine an action to perform based on the state information.

The actions may generally comprise determining to activate, deactivate or restart one or more of the plurality of closed CLs. In other words, the RL agent determines which closed CLs should be active at any given time in order to most efficiently move the environment towards the predefined target.

In the context of communications networks, the RL agent may be configured to activate and inactivate CLs for optimizing loop-execution-related resources while satisfying the customer intents at acceptable levels.

In some embodiments, the RL agent is configured to determine a first subset of closed CLs in the plurality of closed CLs that are to be active in the control system. The output of the RL agent may thus comprise an indication of the first subset of closed CLs. Such an indication may comprise, for example, an enumeration of the CLs that should be active. In such embodiments, the action may comprise activating the first subset of the plurality of closed CLs (e.g. activating any CLs that are currently inactive in the first subset of closed CLs).

The RL agent may be further configured to determine a second subset of closed CLs in the plurality of closed CLs that are to be inactive in the control system. The action may thus comprise setting the second subset of the plurality of closed CLs to be inactive (e.g. deactivating any CLs that are currently active in the second subset of closed CLs).

The RL agent may be further configured to determine a third subset of closed CLs in the plurality of closed CLs that are to be restarted in the control system. The action may thus comprise restarting the third subset of the plurality of closed CLs.

The action may apply for a predetermined time interval. In other words, the RL agent may determine that the first subset of closed CLs should be active and the second subset of closed CLs should be inactive for a first time interval. In other embodiments, the RL agent may specify a time interval in which each closed CL is to be active or inactive for.

As an example, the action may take the form: $S=<L_1, L_5, L_6, L_9, L_{11}, L_{21}, t=10>$ to indicate that the $1^{st}$, $5^{th}$, $6^{th}$, $9^{th}$, $11^{th}$ and $21^{st}$ closed CLs are to be active for the 10 seconds following performance of the action. This is merely an example however and the skilled person will appreciate that indications of other forms may equally be used to describe which closed CLs are to be active over a particular time period. In such embodiments the value of t may also be included in the updated state information.

In some embodiments, further information can be provided to the RL agent, for example, such as configuration parameters of the closed CLs. In such embodiments, the RL agent may thus be configured to predict configuration parameters for the closed CLs that will bring the environment on which the control system acts towards the predefined target. In such embodiments, the action may thus comprise setting a configuration parameter for a first (or generally one or more) closed CL in the plurality of closed CLs.

Configuration parameters that may be set or adjusted include but are not limited to: configuration parameters relating to an amount of data to be collected by the first closed CL and/or a time interval that the first closed CL should leave between requests for data from the control system. In this way, the RL agent is able to influence the volume and frequency of data transfers to the closed CL loops.

In a communications network, an action from the RL agent may, for example, configure the closed CLs to collect less data from the underlying network. For example, instead of querying a network element for its current state every 10 seconds, the querying can be modified to happen in longer periods, e.g. once every 10 minutes. By reducing the sampling interval, less bandwidth is used to transfer monitoring information. In this variant, the data collection time interval is included as a state element (in order to keep the state space finite, we can choose from a finite set of interval values). The actions include selection of a (new) data collection interval; selection of a volume of data that should be collected; and/or selection of different types of data that should be collected, e.g. possibly with lower overheads.

As an example, the action may take the form: $S=<L_1, C_1, L_5, C_5, L_6, C_6 L_9, C_9, L_{11}, C_{11}, L_{21}, C_{21}, t=10>$ to indicate that the b $1^{st}$, $5^{th}$, $6^{th}$, $9^{th}$, $11^{th}$ and $21^{st}$ closed CLs are to be active with configuration parameters $C_1$-$C_{21}$ respectively, for the 10 seconds following performance of the action. This is merely an example however and the skilled person will appreciate that indications of other forms may equally be used to describe which closed CLs are to be active and with which configuration parameters, over a particular time period. In such embodiments, the current C values may also be provided to the RL agent in the state information.

In the context of communications networks, the RL agent may be rewarded based on whether actions performed by the RL agent reduce (or optimise) data transfer, whilst still meeting the predetermined target in the communications network. This can be used to reduce latency and improve privacy (due to less data transfer of user sensitive data across the network).

In some embodiments, the reward is determined (e.g. calculated) based on changes in key performance indicators, KPIs, quality metrics, or other measurable quantities measured in the environment. The KPIs may be monitored during the predetermined time interval (e.g. the time interval that the action is predicted for by the RL agent) after the action is performed. The KPIs may be used to determine whether the environment has moved towards the predetermined target.

The reward may be based on whether the action changes the KPIs towards the predetermined target. For example, the RL agent may receive a positive reward if the change (or average change) in KPI is in the direction of the predetermined target values of the respective KPIs.

The RL agent may receive a negative reward if the change (or average change) in KPI is not in the direction of the predetermined target values of the respective KPIs.

The reward may increase (e.g. be positive) when an intent (e.g. target) satisfaction score increases, network resource usage decreases and/or CL resource usage decreases. Conversely, the reward may decrease (e.g. be negative) when an intent (e.g. target) satisfaction score decreases, network resource usage increases and/or CL resource usage increases as a result of the action.

As an example, for a control system acting in a communications network, a reward, r, may be calculated according to:

$$r = \text{intent\_satisfaction\_score} - \text{network resource usage} - \text{CL resource usage}$$

In this example, Intent_satisfaction_score is defined as a weighted sum of scores per KPI based on the target. For example, if latency<=10 is the target, if latency==12, we have a score (10-12)=−2. If throughput>=3 and actual throughput==4, we have a score (4-3)=1. Then the total intent_satsfaction score=−2*W1+1*W2 where W1 and W2 are weights defined by the user per KPI, taking into account normalization. Network resources can be assigned costs in the same scales (cost/unit time) and added up to get the total reward. It will be appreciated however that this is merely an example and that the reward function will vary depending on the particular application, The rewards received may be used e.g. as feedback to further train the RL agent. For example, the method 200 may further comprise using the state, the determined action, the determined reward, and an updated state following the action (e.g. an indication as to whether each of the plurality of closed CLs is active or inactive as a result of performing the action), as training data to further train the RL agent.

Generally, the states of the RL agent are a subset of CLs. So, if there are N CLs, each state can be represented as an N-bit vector and a reward component e.g. [<1,1,0,1>, w]. Each action specifies a set of loops to activate and a set of loops to inactivate. We can use an N-bit vector to present the actions well. The rewards are associated with the transitions through the function Reward([<1,1.0.1>, w1], [<0,1,1,0>, w2)=w2−w1. So an example experience S,A,R,S' that could be used to train the RL agent would be [<1,1,0,1>, 5], [<0,1,1,0>], 7, [<0,1,1,0>, 12]. It will be appreciated that this is merely an example however and that the form of the S,A,R,S' vector will vary according to the application.

It is noted that domain knowledge may be considered when determining an appropriate action in order to avoid unsafe or costly errors. For example, in a communications network, certain loops e.g. for handover, may be flagged to ensure that they are never inactivated. As another example, in control systems used to manage factory equipment, closed CLs for managing safety aspects may, for example, be flagged to ensure that they are never inactivated.

Furthermore, in embodiments where the control system is active in a communications environment, the method 200 may further comprise obtaining an indication from an Operations, Administration and Management, OAM, node related to the utility of a second closed CL in the plurality of closed CLs, and updating the action based on the indication from the OAM. For example, the RL agent could be assisted by the OAM for planning. For example, the OAM may detect that the contribution of an optimization-intent-based CL in the overall end-to-end (E2E) experienced KPI of the UE is negligible (for a time horizon of T minutes). As another example, it could be an intent-based CL for a router configuration, which could be deactivated if the CL for discovery of paths avoids the router altogether. In such cases, the agent may choose to disable these CLs (after computing the side-effects) and limit the set of enforced CLs to the orchestrator.

In some embodiments, other information may be provided as input to the RL agent. For example, the method 200 may further comprise providing as input to the RL agent, one or more dependencies between the closed CLs in the plurality of closed CLs, wherein the RL agent further determines an action to perform in the control system based on the one or more dependencies. The one or more dependencies may be obtained from, or determined using, a digital twin, DT, of the control system.

The skilled person will be familiar with digital twins, but in brief, a digital twin (DT) is the virtual representation of any asset (e.g. physical object, hardware, software, process, etc.) across its lifecycle. It uses real-time data and other data sources to facilitate learning, reasoning and dynamically adjusting for a better decision making. DTs have passive parts which include static information of the asset and are introduced by the developer (vendor). They also have active parts that can change in run-time and be updated across the asset lifecycle. By integrating the DT concept into the intent handling mechanism, the related information of the CLs may be updated periodically to be used by the RL agent. In our setting, we consider that there is a DT describing each intent-based CL which can communicate with the RL agent. The information regarding the CLs such as dependencies on other CLs can be stored in the DT and be leveraged by the RL agent. The CL dependencies can be written in the passive part of the DT by the developer of the CL while the other information that can change in run time such as virtual state and rewards can be written in the active part. By utilizing the passive and active information stored in the DT, the RL agent makes a decision on CL and writes the recommended action, Ls', in the active part of the DT. In particular, the information on the dependencies of the CLs which are retrieved from the DT can lead to a safer decision-making and avoid impacting negatively on any CL that depends on an inactivated CL.

As an example, a digital twin may be implemented as described in the paper by Schluse & Rossmann, 2016 entitled: "From simulation to experimentable digital twins: Simulation-based development and operation of complex technical systems". In this paper, the authors implemented DT. As described therein, the static part can be any data container and active part can be implemented with "Versatile Simulation Database". In 14.0 domain, the DT can be also implemented as Asset Admin Shell (AAS), the CL dependencies can be written in the passive part of the AAS whereas virtual states and rewards can be written in the active part of the AAS. An ASS may be implemented using an open source library, such as for example, "The AASX Package Explorer", as described in the paper by Barnstedt et al. 2018 entitled: "Details of the Asset Administration Shell. Part 1—The exchange of information between partners in the value chain of Industrie 4.0".

An embodiment showing a DT is illustrated below with respect to FIG. 7.

Figure 4:
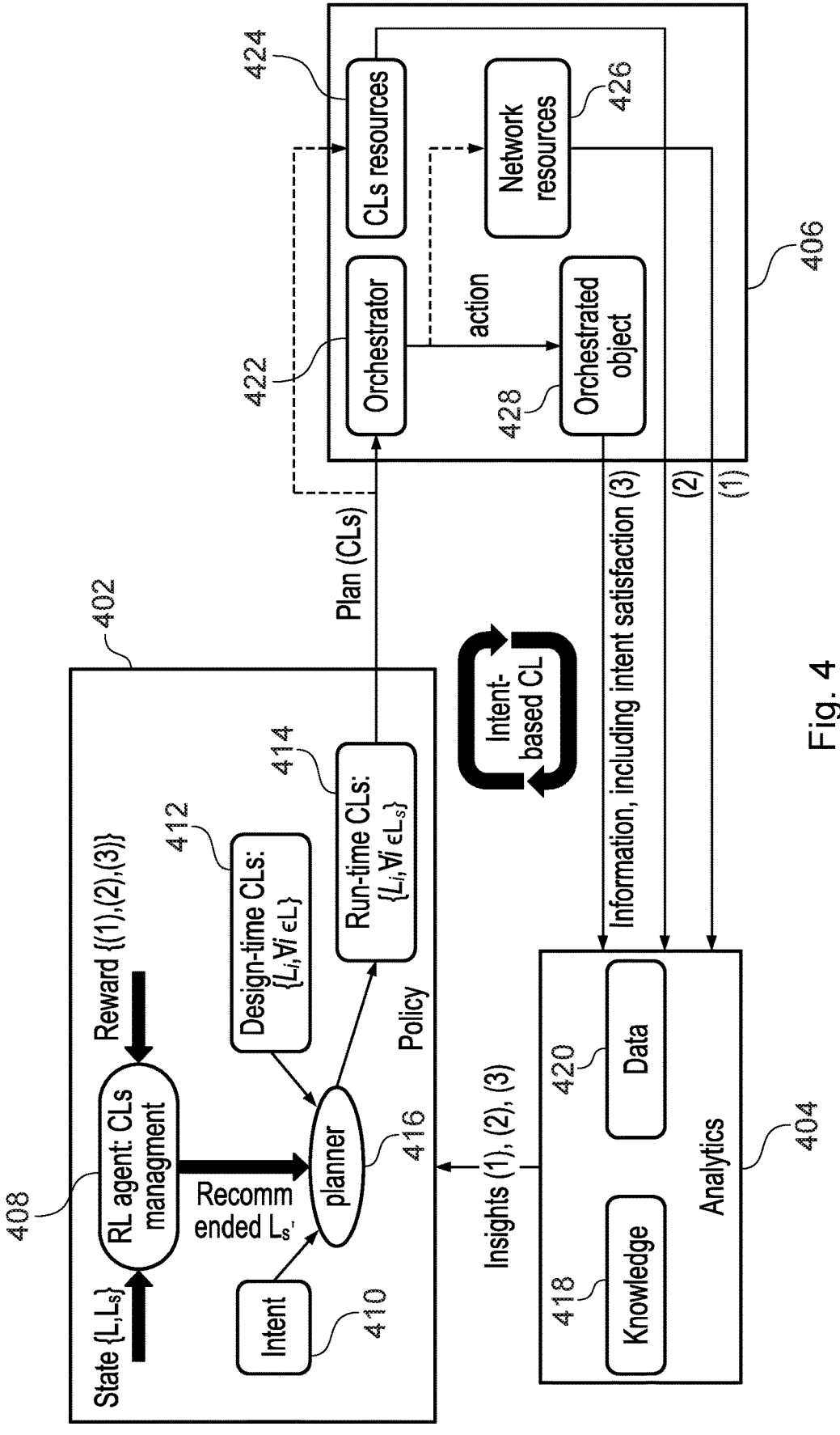
FIG. 4 shows a system according to some embodiments herein.

Turning now to FIG. 4, which illustrates a RL agent 408 used for managing intent-based CLs used for lifecycle management in a communications network. In this example, the RL agent 408 operates in a node 402 comprising a planner 416. The planner 416 acts as the control system and activates, deactivates, restarts and configures the closed CLs. The planner may be thought of as an "outer CL". The planner 416 receives a predefined target. In this embodiment, the predefined target is an intent 410.

The planner has access to a plurality of CLs 412 which are set in design-time.

The planner interacts with other agents/domains to deploy and execute the intent-based CLs. At any given time, a first subset 414 of the design-time CLs are active, e.g. operating in run-time. The RL agent predicts actions for use by the planner. Actions may comprise any of the actions described above with respect to the method 200, such as, for example, activating, suspending, terminating, or restarting different subsets of the design-time CLs 412.

The active CLs 414 interact with different aspects of the communications network, such as for example, node(s) involved in resource orchestration 406. Such node(s) may include an orchestrator 422 that may orchestrate resources of particular hardware/software components 428 in the communications network. The CLs may also request resources 424 such as data 420 from the communications network, for use in managing their respective processes.

The node(s) 406 may interact with an analytics node or module 404. This gathers data 420 such as KPIs and intent satisfaction scores for the intent 410. These, combined with knowledge 418 may be sent back to the control system 402 for use in rewarding the agent for actions performed. For example, the analytics module 404 may extract a CL's resource consumption footprint for use by the RL agent 408 and planner 416 in investigating if it is possible to decrease it without affecting the intent 410.

It will be appreciated that the configuration illustrated in FIG. 4 is merely an example and that the processes described may be distributed over different nodes or different combinations of nodes to those shown in FIG. 4.

Figure 5:
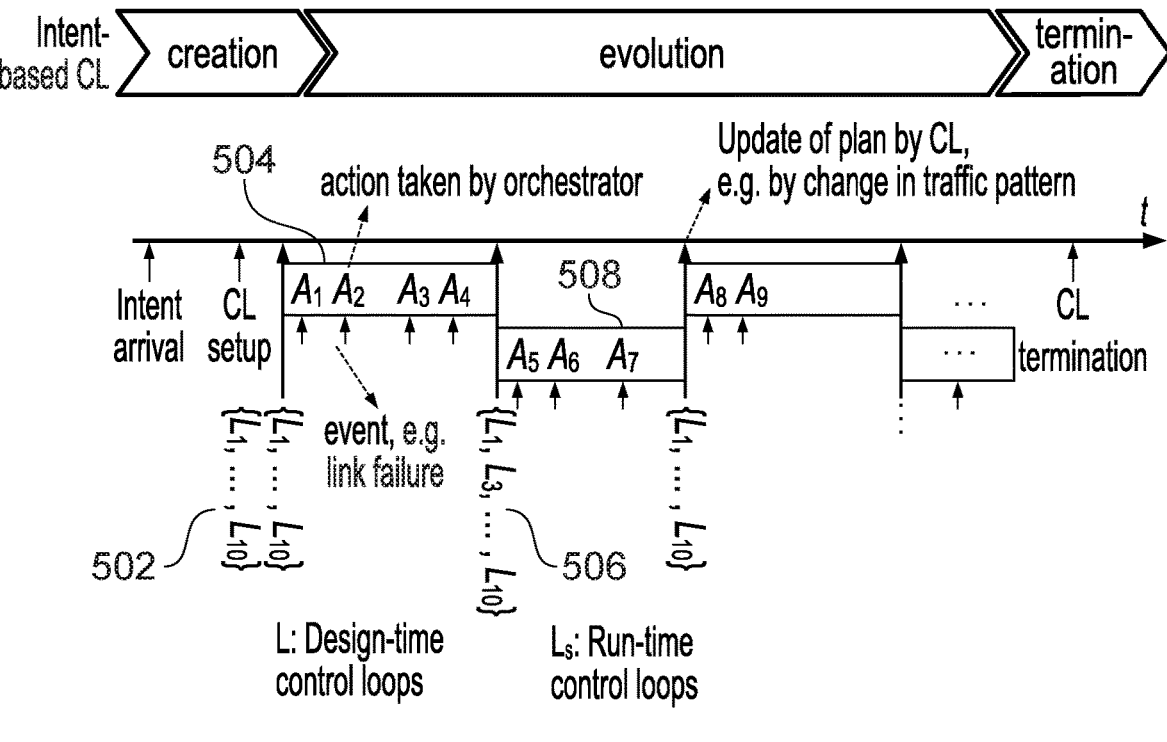
FIG. 5 shows a method according to some embodiments herein.

Turning now to FIG. 5 which illustrates a process performed by a node such as the node 402 shown in FIG. 4. In this example, the predefined target is an intent. This example illustrates a lifecycle of an intent-based closed CL in which, at design-time, ten CLs are configured, $L_1$-$L_{10}$. The planner (e.g. "outer" loop) starts at time 502 by activating the full set of design-time CLs expected to be needed for intent fulfilment. These CLs are activated for a time window 504 after which the RL agent is used to determine an action 506 to be performed on the closed CLs (e.g. to activate, restart, deactivate and/or set configuration parameters of the CLs). The action is performed such that in the subsequent time window 508 only a first subset of the CLs is activated.

Data is collected in the communications network, such as for example, events such as link failures (indicated by the arrows in FIG. 5). And this is used as feedback with which to train the RL agent. Through interaction with the orchestrated object/domain in this manner, the agent learns if it can mute or reconfigure some of the CLs whilst still satisfying an initial intent/target. The reward may be a function of: Reward=<Intent satisfaction, network resource usage, loop resource usage>.

Figure 6:
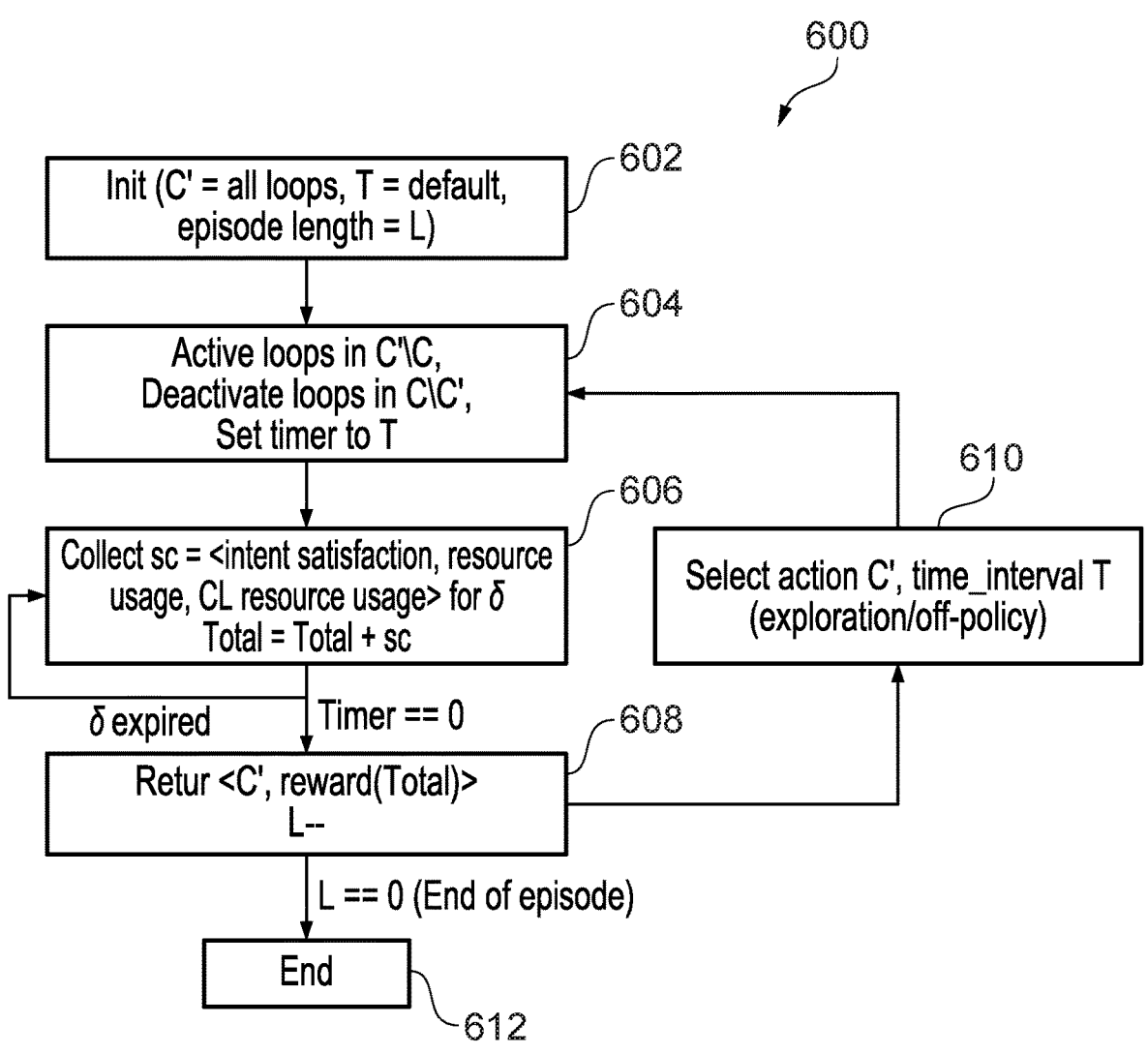
FIG. 6 shows a method according to some embodiments herein.

Turning now to FIG. 6. which illustrates an embodiment herein.

In this embodiment, the RL agent may be defined as follows:

States—each state indicates a subset of the plurality of CLs. The semantic is that this subset of CLs is active in this state.

Actions—Activate/inactivate a subset of CLs

Rewards—The rewards are defined on a state as a sum of normalized values for the KPI expectations derived from the intents (intent satisfaction score), network resource usage and CL resource usage. These may be computed for a time interval after a state transition—call it the CL evaluation phase. Note that the overall reward increases when intent satisfaction score increases, network resource usage decreases and CL resource usage decreases.

Transitions—$P(s',r'|s,a)$—In any state, an action may lead to a different set of active closed loops. While the state part is deterministic, the rewards very much depend upon the environment which triggers different actions from the loops and hence results in different rewards at the end of the CL evaluation phase.

The RL agent can be trained using RL processes (e.g. such as Q-learning). The training data is generated by (1) simulators (2) emulators, and/or (3) system logs either in an offline (batch mode) or online manner. In either case, the data is generated, and the learning is performed as shown in FIG. 6. The data generation procedure generates the experience sequence <s0,a0,s1,r1>, <s1, a1,s2,r2> . . . where si's are the states (active loops), ai's are activation/deactivation actions ri's are rewards. When a time-interval is a part of the state, as the figure suggests, each observation is gathered during the time-interval. Since the control loops (re)configure the system responding to different events, intent satisfaction scores and resource usage can vary during an observation period. Therefore, these may be collected at a smaller granularity (o) and e.g. summed them to get the overall score for the time-interval. The steps of the experience generation are described in detail in the following:

C denotes the currently active closed CLs. Initially, the system sets C to all CLs (e.g. all loops are set as active) in step 602. T—the observation time is initialized to a default value and the length of the episode of experiences is initialized to L A RL agent is used to determine an action to perform in the control system with respect to the plurality of closed CLs. The RL agent suggests an action C' and this is applied in step 604 and observation period T through exploration or through an off-policy procedure using another policy. The state is updated with the new list of active closed CLs, and with the new observation period.

During the observation period T, intent satisfaction score, resource usage and CL resource usage are measured in step 606 over every small interval δ and processed to get the overall scores for the observation period T. Processing depends upon the metrics applicable to the particular use case, but could for example, be based on Latency and throughput. Such metrics may be averaged, and/or financial cost may be summed up. The output of step 606 may be returned in step 608 as a reward for the RL agent for the current state.

In step 610 the learning process iteratively continues by selecting another action C' and applying that action in step 604.

Step 612 represents the termination of an episode. The termination criteria is defined initially by the "episode length". In each iteration, L is decreased by 1, and when it reaches 0, the episode is terminated.

Figure 7:
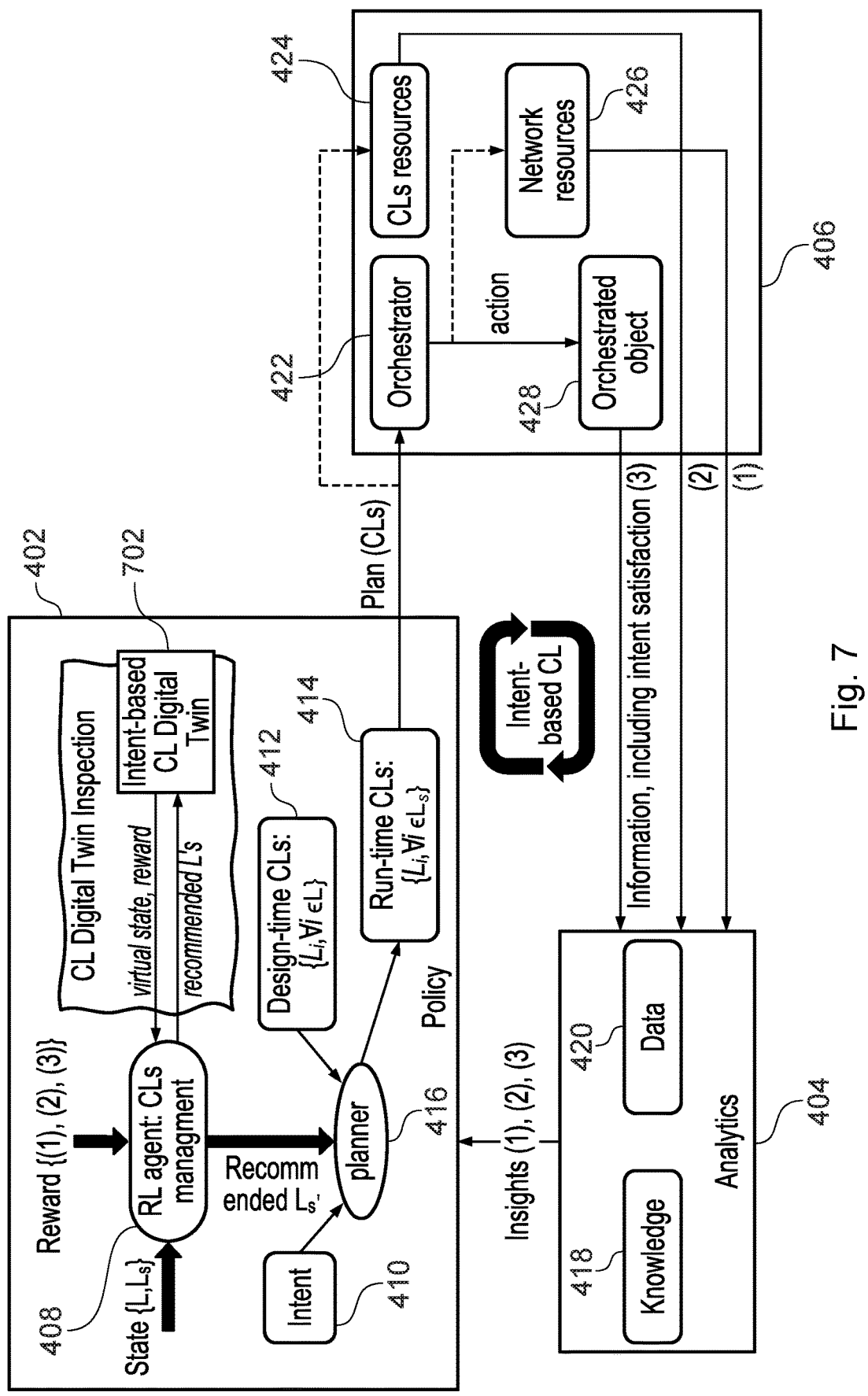
FIG. 7 shows a system according to some embodiments herein.

Turning now to other embodiments, FIG. 7 illustrates another example herein. In this example the system shown in FIG. 4 is augmented to include a digital twin 702. The digital twin provides additional input information to the RL agent 408. This was described above with respect to the method 200 and the detail therein will be understood to apply equally to the system in FIG. 7.

Figure 8:
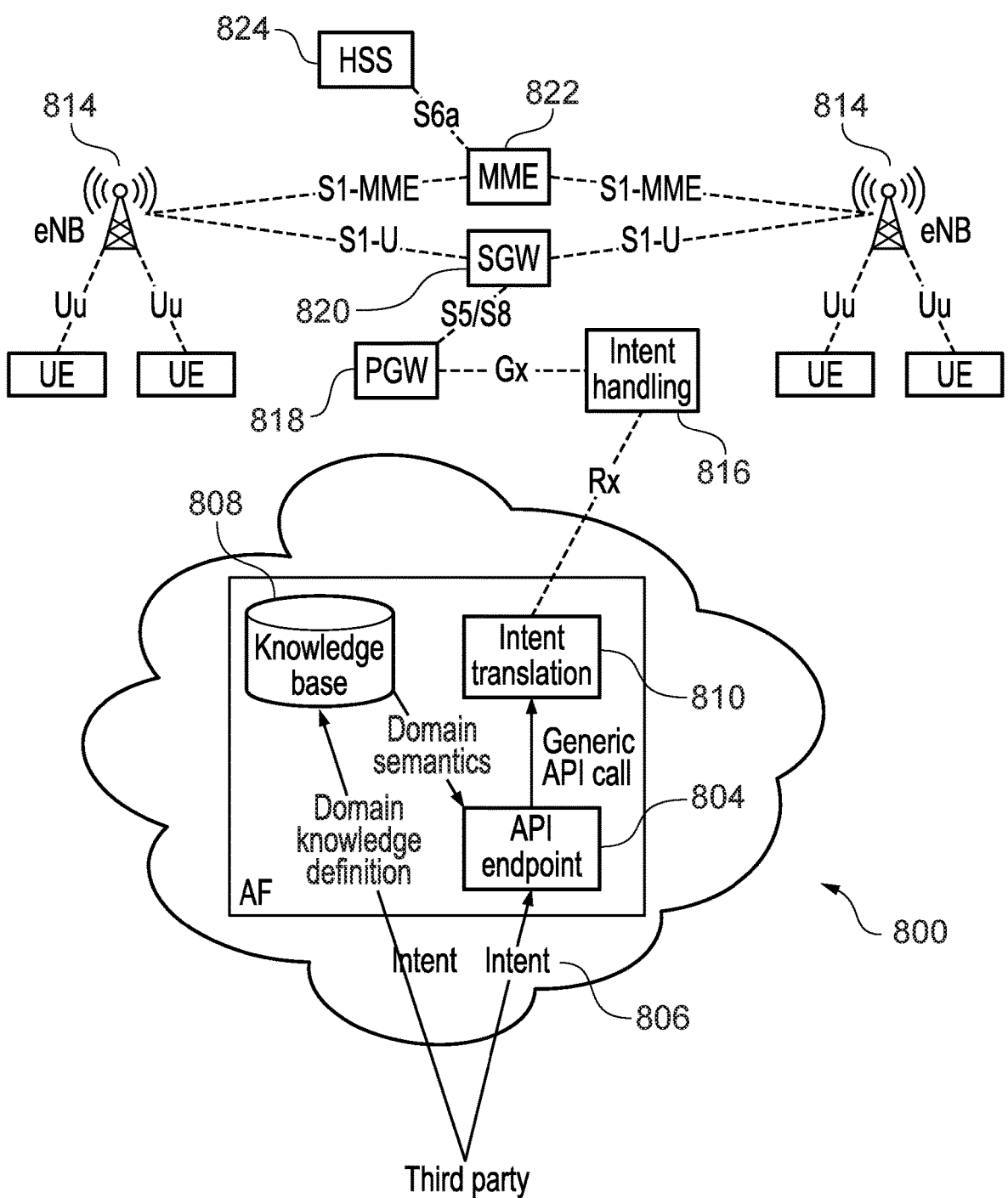
FIG. 8 shows an example in a communications network according to some embodiments herein.

Turning now to FIG. 8, which illustrates a proposed intent (set of QoS expectation in this context) management procedure in a mobile communications network according to some embodiments herein. In this embodiment, a predefined target in the form of an intent 806 is sent by a third party to a knowledge base 808 and API endpoint handler 804. The intent is translated e.g. into KPI or other measurable targets in block 810 and sent to an intent handling module 816. Intent handling module 816 may comprise the node 100 as described above and perform closed CL management according to method 200 as described above, using a RL agent. Intent handling module 816 may manage CLs in various parts of the network, such as the PGW 818, MME 822, SGW 820 and/or HSS 824. The RL agent receives rewards based on whether the environment, including base stations 814 moves towards the intent 806 as a result of actions performed by the RL agent.

Figure 9:
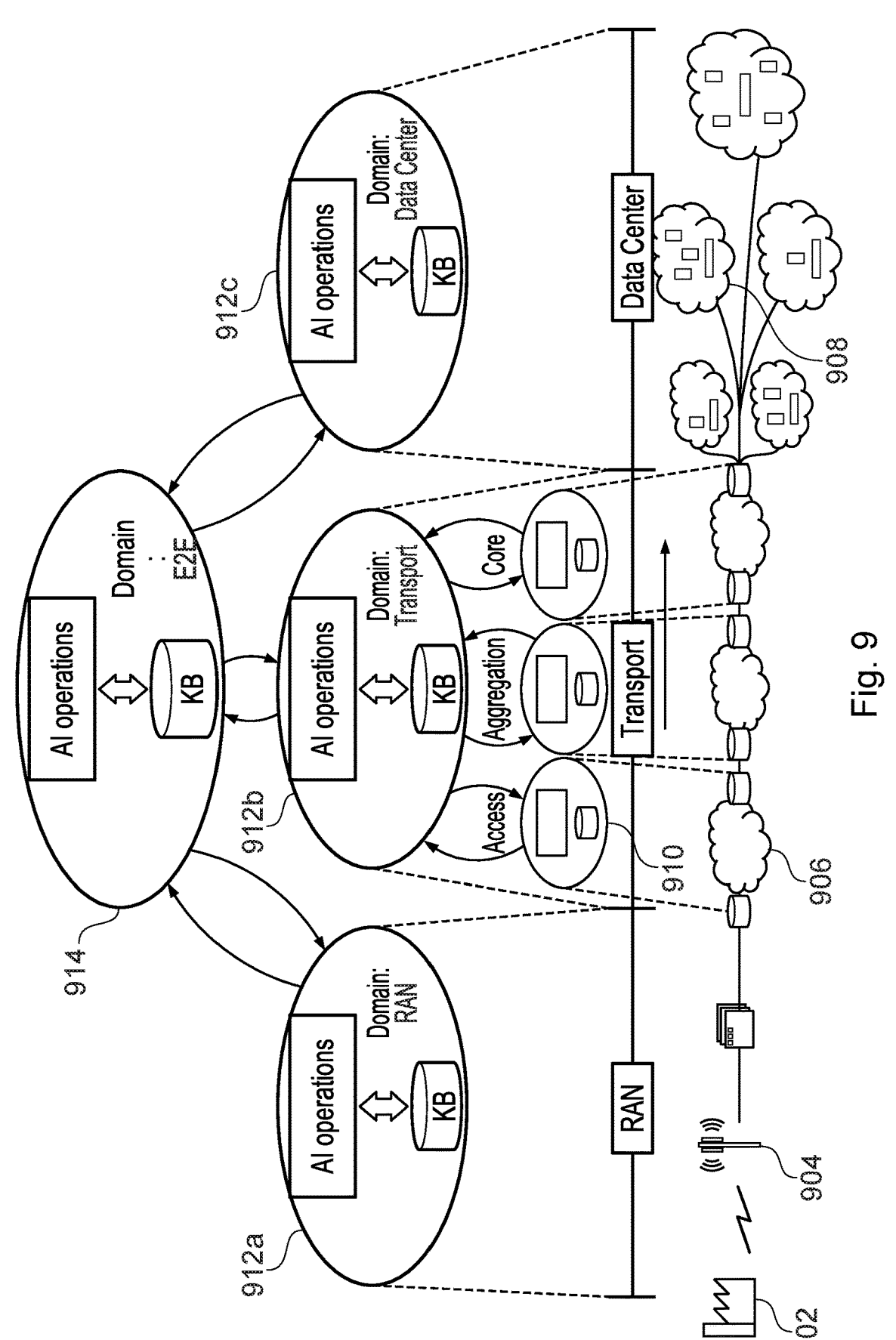
FIG. 9 shows an example in a communications network according to some embodiments herein.

FIG. 9 illustrates another embodiment herein where the control system is for managing traffic over a network slice of a communications network and where the plurality of closed CLs are for managing performance of said traffic over the network slice.

The Figure shows a Base Station 904, an abstract view of transport links 906, an instance of a data centre deployment 908. Each of the domains (RAN, transport, data center) has its own CLs. However, the "transport" domain includes a set of sub-domains, in each of which a CL resides. 910 represents the CLs in each of these sub-domains of transport domain. 914 represents the end-to-end domain, which is the top layer of the hierarchy among the domains and corresponding CLs.

As an example, the traffic may be from a manufacturing facility 902 and the plurality of closed loop CLs are for managing performance of UDP and/or HTTP traffic from the manufacturing facility 902. A smart factory customer has two types of traffic over a network slice as follows: video traffic from robots (UDP), and sensory information (HTTP). While the UDP flow is almost constant 24/7, the HTTP traffic consists of regular and event-driven reporting, and hence, the flow pattern may oscillate during run-time. For assuring the performance of UDP traffic, different intent-based CLs have been deployed in various domains. Here we focus on one of them in the transport network. Intent-based CLs in different domains of connectivity, including RAN 912*a,* Transport (Access, Aggregations, and Core) 912*b,* and data centre 912*c.* In the following, we restrict our focus to one CL in the transport network, which hosts UDP and HTTP traffic over shared resources.

Figure 10:
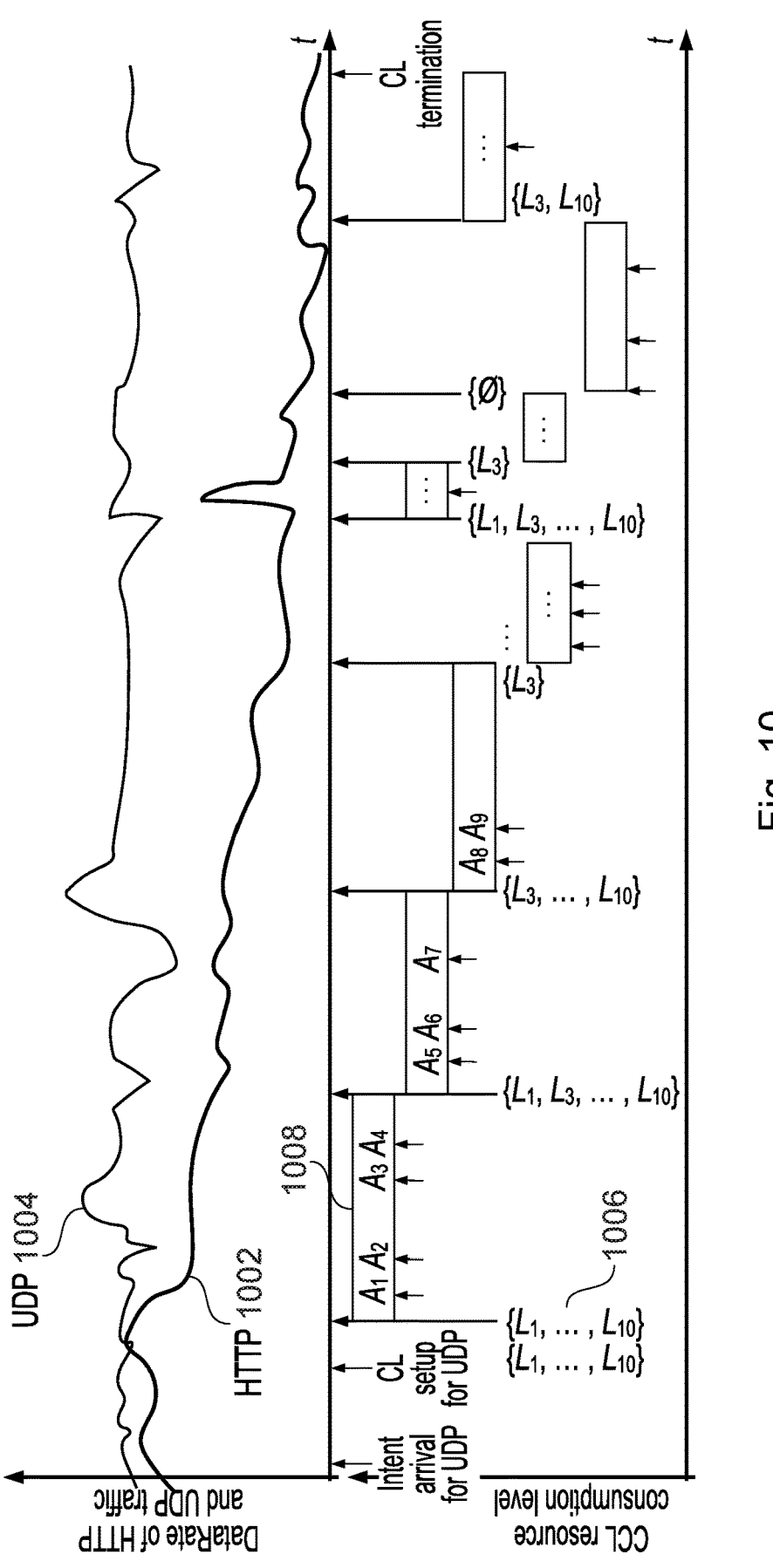
FIG. 10 shows an example output of a method according to some embodiments herein.

FIG. 10 shows the contribution of the proposed agent in reducing intent-based CL's resource consumption. The considered intent-based CL is deployed for the UDP traffic. The data rate of UDP is almost the same throughout analysis, while the competitor traffic type is decreasing.

FIG. 10 (top) represents the data rate for UDP 1004 and HTTP 1006 traffic flows with respect to time. In the bottom part of the same figure, over the time-axis, one observes events occurring in different epochs, including start of intent-based CL 1006, termination of intent-based CL, operation events like failures (indicated by the vertical arrows), respective actions (A_i), and the active CLs in each time window, i.e. {L_i . . . }. Furthermore, the y-axis represents an indicator of intent-based CL's resource consumption based on the number of active CLs. Thus, FIG. 10 demonstrates that resource consumption of CLs may be reduced whilst maintaining UDP and HTTP traffic flows at a level to satisfy a predetermined target (in this case in the form of an intent).

Turning now to other embodiments, there is provided a computer program product comprising a computer readable medium, the computer readable medium having computer readable code embodied therein, the computer readable code being configured such that, on execution by a suitable computer or processor, the computer or processor is caused to perform the method or methods described herein.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer implemented method for managing a plurality of closed control loops, CLs, operable in a control system, the method comprising:

using a reinforcement learning, RL, agent, to determine an action to perform in the control system with respect to the plurality of closed CLs in the control system;

wherein the RL agent is configured to determine a first subset of closed CLs in the plurality of closed CLs that are to be active in the control system;

wherein the RL agent is configured to determine a second subset of closed CLs in the plurality of closed CLs that are to be inactive in the control system, and wherein the action comprises setting the second subset of the plurality of closed CLs to be inactive;

wherein the RL agent is rewarded based on an extent to which an environment on which the control system acts moves towards a predefined target as a result of performing the determined action.

2. A method as in claim 1 wherein the output of the RL agent comprises an indication of the first subset of closed CLs.

3. A method as in claim 1 wherein the action comprises activating the first subset of the plurality of closed CLs.

4. A method as in claim 1 wherein the RL agent is configured to determine a second subset of closed CLs in the plurality of closed CLs that are to be inactive in the control system, and wherein the action comprises setting the second subset of the plurality of closed CLs to be inactive.

5. A method as in claim 1 wherein the action comprises setting a configuration parameter for a first closed CL in the plurality of closed CLs.

6. A method as in claim 5 wherein the configuration parameter indicates an amount of data to be collected by the first closed CL and/or a time interval that the first closed CL should leave between requests for data from the control system.

7. A method as in claim 1 wherein the action applies for a predetermined time interval.

8. A method as in claim 7 wherein the reward is determined from changes in key performance indicators, KPIs, measured in the environment during the predetermined time interval after the action is performed.

9. A method as in claim 1 further comprising:

providing as input to the RL agent, one or more dependencies between the closed CLs in the plurality of closed CLs, wherein the RL agent further determines an action to perform in the control system based on the one or more dependencies.

10. A method as in claim 9 wherein the one or more dependencies are obtained from a digital twin, DT, of the control system.

11. A method as in claim 1 wherein the predefined target comprises a plurality of sub-targets, each sub-target being assigned to a different one of the plurality of closed CLs.

12. A method as in claim 1 wherein the predefined target is a target configuration for the environment or a target performance in the environment.

13. A method as in claim 1 wherein there is interaction between policies of the plurality of closed CLs.

14. A method as in claim 1 further comprising:

providing as input to the RL agent, a state, s of the control system wherein the state provides an indication as to whether each of the plurality of closed CLs is currently active or inactive.

15. A method as in claim 14 wherein the method further comprises:

using the state, the determined action, the determined reward, and an indication as to whether each of the plurality of closed CLs is active or inactive as a result of performing the action, as training data to train the RL agent.

16. A method as in claim 1 wherein the control system operates in a communications network and the plurality of closed CLs manage processes in the communications network.

17. A method as in claim 16 wherein the predefined target comprises one or more Key Performance Indicator, KPI, targets, as determined from a business intent, BI for the communications network.

18. A method as in claim 16 further comprising obtaining an indication from an Operations, Administration and Management, OAM, node related to a utility of a second closed CL in the plurality of closed CLs, and updating the action based on the indication from the OAM.

19. A method as in claim 16 wherein the reward is positive when:

a satisfaction score for the predetermined target increases;

network resource usage decreases; and/or

CL resource usage decreases.

20. An apparatus for managing a plurality of closed control loops, CLs, operable in a control system, wherein the apparatus comprises:

a memory comprising instruction data representing a set of instructions; and a processor configured to communicate with the memory and to execute the set of instructions, wherein the set of instructions, when executed by the processor, cause the processor to:

use a reinforcement learning, RL, agent, to determine an action to perform in the control system with respect to the plurality of closed CLs in the control system;

wherein the RL agent is configured to determine a first subset of closed CLs in the plurality of closed CLs that are to be active in the control system and a second subset of closed CLs in the plurality of closed CLs that are to be inactive in the control system;

wherein the action comprises setting the second subset of the plurality of closed CLs to be inactive; and wherein the RL agent is rewarded based on an extent to which an environment on which the control system acts moves towards a predefined target as a result of performing the determined action.

* * * * *